United States Patent [19]
Nagase et al.

[11] 3,928,485
[45] Dec. 23, 1975

[54] ISOMERIZATION OF OLEFINS

[75] Inventors: Tsuneyuki Nagase; Gohu Suzukamo; Masami Fukao, all of Takatsuki, Japan

[73] Assignee: Sumitomo Chemical Company, Limited, Japan

[22] Filed: Jan. 2, 1974

[21] Appl. No.: 429,948

Related U.S. Application Data

[63] Continuation of Ser. No. 164,151, July 21, 1971, abandoned.

[30] Foreign Application Priority Data

July 23, 1970 Japan.............................. 45-64625
Sept. 5, 1970 Japan.............................. 45-78006
Feb. 2, 1971 Japan.............................. 46-4146

[52] U.S. Cl........................... 260/680 R; 260/683.2
[51] Int. Cl.² ........................................... C07C 5/30
[58] Field of Search..................... 260/683.2, 680 R

[56] References Cited
UNITED STATES PATENTS

| | | | |
|---|---|---|---|
| 2,952,719 | 9/1960 | Appell............................ | 260/683.2 |
| 3,204,009 | 8/1965 | Keith............................. | 260/683.2 |
| 3,405,196 | 10/1968 | Wolff............................. | 260/683.2 |
| 3,437,698 | 4/1969 | O'Grady et al................. | 260/683.2 |
| 3,808,152 | 4/1974 | Nagase et al.................... | 252/463 |

*Primary Examiner*—Paul M. Coughlan, Jr.
*Attorney, Agent, or Firm*—Stewart and Kolasch

[57] ABSTRACT

In the isomerization of olefins by contacting a linear, isomerizable olefinic hydrocarbon with a catalyst to the corresponding linear, isomerized olefinic hydrocarbon, a process wherein the catalyst is an alkaline catalyst composition prepared by heating an alkali metal, an alkali metal hydroxide and alumina at a temperature higher than the melting point of the alkali metal. By the use of the said catalyst composition, the isomerization can be accomplished much more efficiently, compared with the case of using conventional catalyst compositions.

15 Claims, 1 Drawing Figure

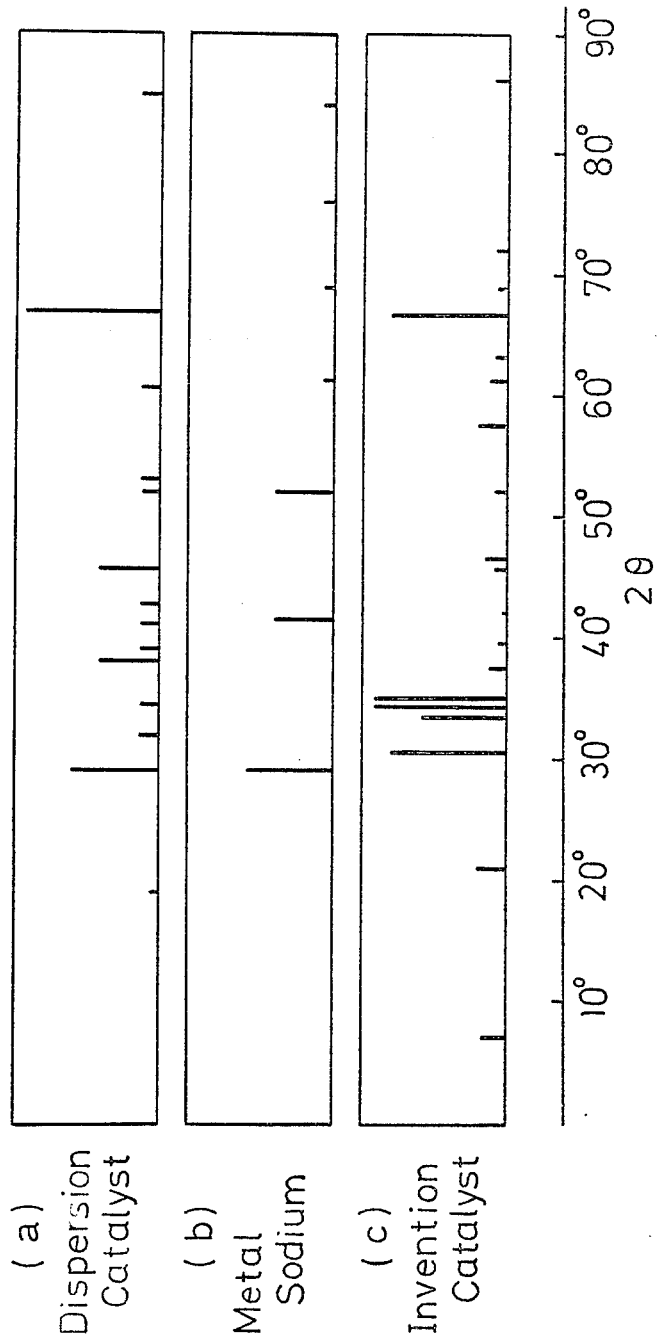

ISOMERIZATION OF OLEFINS

This application is a continuation of copending application Ser. No. 164,151, filed on July 21, 1971, now abandoned.

The present invention relates to a process for isomerization of olefinic double bonds. More particularly, it relates to a process for isomerization of olefins by the use of a novel catalyst composition.

For isomerization of olefins, various catalyst compositions have been proposed. However, those known catalyst compositions are disadvantageous in causing decomposition of the starting olefins, affording undesired polymers of the starting olefins, giving the olefins isomerized but at random and the like. For instance, there has been known a catalyst composition where an alkali metal is dispersed on a carrier material having a large surface area such as alumina, silica gel, activated carbon or sodium carbonate (hereinafter referred to as "dispersion catalyst")[J.Am.Chem.Soc., 82, 387 (1960)]. This conventional dispersion catalyst is considerably effective but is easily ignited on the exposure to air or reacted readily with water to generate hydrogen, whereby the catalytic activity is lost. Such unstability is a great disadvantage inherent in the dispersion catalyst of the said type and needs careful treatment on its use.

It has now been found that heating of an alkali metal, an alkali metal hydroxide and alumina affords a novel alkaline catalyst compositions which shows an excellent catalytic activity in isomerization of olefins with a long catalytic life. Particularly notable is its high stability to air and water. Thus, the catalyst composition can be handled without any special care in the atmosphere.

A basic object of the invention is to embody a process for isomerization of olefins. Another object of the invention is to embody a process for producing olefins by the use of a catalyst composition useful in isomerization of olefins. These and other objects will be apparent to those conversant with the art to which the present invention pertains from the subsequent descriptions.

The catalyst composition of this invention can be prepared by heating an alkali metal, an alkali metal hydroxide and alumina at a temperature higher than the melting point of the alkali metal.

As the alkali metal, there may be used one or more of lithium, sodium, potassium, rubidium and other metals in Group I of the periodic table. These metals may be used in the form of alloy consisting of two or more kinds of alkali metals. A typical example of such alloys is sodiumpotassium alloy. Examples of the alkali metal hydroxide are hydroxides of lithium, sodium, potassium, rubidium and other metals in Group I of the periodic table. One or more kinds of them can be used. The alkali metal hydroxide is not necessarily required to correspond to the said alkali metal. Thus, the combination of the alkali metal and the alkali metal hydroxide to be employed may be, for instance, lithium and lithium hydroxide, sodium and sodium hydroxide, potassium and potassium hydroxide or rubidium and rubidium hydroxide as well as lithium and sodium hydroxide, sodium and potassium hydroxide or lithium and potassium hydroxide.

The alumina may be, for instance, $\alpha$-alumina, $\kappa$-alumina, $\theta$-alumina, $\delta$-alumina, $\gamma$-alumina, $\eta$-alumina, $\zeta$-alumina or $\rho$-alumina. There may be also used such an alumina-containing material as kaolin or alumina silicate for the source of alumina. Usually, however, the use of alumina itself is much favorable.

The amount of the alkali metal hydroxide to the alumina is not limitative but is normally preferred to be 1/100 to 100 percent by weight. The alkali metal may be employed in an equimolar or less amount, preferably in an equimolar to 1/100 molar amount, with respect to the alkali metal hydroxide.

For preparation of the catalyst composition of the invention, the said materials, i.e. the alkali metal, the alkali metal hydroxide and the alumina, are heated at a temperature higher than the melting point of the alkali metal (preferably from 200° to 500°C), ordinarily in an inert gas such as nitrogen, helium or argon while stirring. The reaction time is associated with the temperature of heating and may be usually from 1 to 30 hours. A higher temperature requires a shorter reaction time.

Practically, the alumina is first heated to a desired temperature and, while maintaining such temperature, the alkali metal and the alkali metal hydroxide are added thereto. Although the order of incorporation of these materials is optional, the order of the alumina, the alkali metal hydroxide and the alkali metal is the most preferred. In this case, the alkali metal hydroxide can be used in the form of an aqueous solution, provided that the water in such solution is sufficiently removed, usually under reduced pressure, prior to the addition of the alkali metal.

In the above procedure, the preparation of the catalyst composition may be started with the use of the alkali metal and an alumina having water removable therefrom, i.e. without using the alkali metal hydroxide. The term "removable water" hereinabove used is intended to mean not only movable water itself but also structural water and hydroxyl groups which can be eliminated in the form of water, inclusively. Thus, the alumina herein utilizable may be any alumina other than $\alpha$-alumina which is considered to include no removable water. The water content in such utilizable alumina may be usually from 1.3 to 15 percent by weight, favorably from 2.3 to 10 percent by weight. The alkali metal is employed in an amount larger than that which can consume completely the water in the starting alumina, preferably 1.01 to 2 times the amount which can use up such water.

Actually, the reaction may be carried out by heating the alumina and a whole amount of the alkali metal together or by heating first the alumina with a portion of the alkali metal so as to consume substantially the water in the alumina and, after the addition of the remaining portion of the alkali metal, continuing the heating. In the latter case, the alkali metal which is initially used may be the same as or different from the one employed later. The reaction temperature and the reaction time may be entirely the same as those mentioned in connection with the procedure using the alkali metal hydroxide.

The said alternative procedure may be understood to be substantially the same as the previous procedure and falling within the scope of this invention, because the reaction is assumed to proceed as follows: a portion of the alkali metal is first reacted with the water removed from the alumina to produce the corresponding alkali metal hydroxide and then the remaining portion of the alkali metal, the produced alkali metal hydroxide and the resultant alumina are reacted with each other.

Different from the conventional dispersion catalyst, the thus obtained catalyst composition does not contain the alkali metal. This is clearly evidenced by the following facts:

1. The catalyst composition of the invention is colored white to greyish white and does not show any pattern attributed to the alkali metal as a simple substance in the X ray diffraction pattern (cf. Figure (c) of the attached drawings), whereas the dispersion catalyst is colored violet to black and shows a pattern attributed to the alkali metal as a simple substance in the X ray diffraction pattern (cf. Figures (a) and (b) of the attached drawings). In this connection, it is notable that the active dispersion catalyst shows a color inherent to the alkali metal as a simple substance such as violet black in case of potassium or black in case of sodium and, then when it turns gray, the catalytic activity is lost [J.Chem.Soc., 1967, 2179].

2. When treated with liquid ammonia, the catalyst composition of the invention does not afford any color, whereas the dispersion catalyst exhibits sensitively a dark violet color due to the alkali metal as a simple substance present therein.

Further, the catalyst composition of the invention may be differentiated from the dispersion catalyst in the essential use of the alumina for its preparation. That is, the use of any conventional carrier material other than and instead of the alumina in the preparation of the catalyst composition according to the present invention does not provide any composition having an appreciable catalytic activity, while the conventional dispersion catalyst prepared by the use of a conventional carrier material other than alumina such as activated carbon, silica gel or sodium carbonate shows the substantially same activity as the one prepared by the use of alumina.

When the reaction of the alkali metal, the alkali metal hydroxide and the alumina according to this invention is carried out insufficiently and incompletely, the resulting composition may include unreacted alkali metal and exhibit some characteristics due to the same. The catalytic activity of such composition is inferior to that of the catalyst composition obtained by the complete proceeding of the reaction but still much higher than that of the conventional dispersion catalyst.

As noted above, the catalyst composition of the invention is greatly advantageous in the strong catalytic activity with the long catalytic life and the high stability to air and water, compared with the conventional dispersion catalyst.

The catalyst composition of the invention is useful in the isomerization of olefinic double bonds, particularly linear olefins. Thus, the contact of olefins with the said catalyst composition results in the migration of a double bond present therein to give the corresponding double bond isomers.

For instance, monoolefins having a double bond at the terminal position, i.e. the 1-position, are contacted with the catalyst composition to give the corresponding isomers having a double bond at the inner position, i.e. the 2-position or any other more stable position. Further, for instance, diolefins having a double bond at the terminal position, i.e. the 1-position, are contacted with the catalyst composition to afford the corresponding isomers wherein the double bond at the terminal position is migrated to any inner position, e.g. the 2-position. In this case, conjugated olefins can be obtained by contacting the corresponding non-conjugated olefins with the catalyst composition. When two or more kinds of conjugated olefins can be present, those may be produced in mixture. Some specific examples of the starting olefins and the produced olefins in the isomerization of this invention are shown below:

| Starting olefins | Produced olefins |
|---|---|
| Butene-1 | Butene-2 |
| Pentene-1 | Pentene-2 |
| Hexene-1 | Hexene-2 |
| Hexene-1 | Hexene-3 |
| Heptene-1 | Heptene-2 |
| Heptene-1 | Heptene-3 |
| 4-Methylpentene-1 | 4-Methylpentene-2 |
| 4-Methylpentene-1 | 2-Methylpentene-2 |
| Octene-1 | Octene-2 |
| 2,3-Dimethylbutene-1 | 2,3-Dimethylbutene-2 |
| 1,4-Pentadiene | 1,3-Pentadiene |
| 2-Methyl-1,4-pentadiene | 4-Methyl-1,3-pentadiene |
| 2-Methyl-1,4-pentadiene | 2-Methyl-1,3-pentadiene |
| 3-Methyl-1,4-pentadiene | 3-Methyl-1,3-pentadiene |
| 1,5-Hexadiene | 2,4-Hexadiene |
| 1,5-Hexadiene | 1,3-Hexadiene |
| 1,4-Hexadiene | 2,4-Hexadiene |
| 1,4-Hexadiene | 1,3-Hexadiene |
| 2-Methyl-1,5-hexadiene | 2-Methyl-2,4-hexadiene |
| 3-Methyl-1,5-hexadiene | 3-Methyl-2,4-hexadiene |
| 3-Methyl-1,5-hexadiene | 4-Methyl-1,3-hexadiene |
| 2-Methyl-1,4-hexadiene | 5-Methyl-2,4-hexadiene |
| 3-Methyl-1,4-hexadiene | 3-Methyl-1,3-hexadiene |
| 2,5-Dimethyl-1,5-hexadiene | 2,5-Dimethyl-2,4-hexadiene |
| 2,5-Dimethyl-1,4-hexadiene | 2,5-Dimethyl-2,4-hexadiene |
| 3,4-Dimethyl-1,5-hexadiene | 3,4-Dimethyl-2,4-hexadiene |
| 3,4-Dimethyl-1,5-hexadiene | 3,4-Dimethyl-1,3-hexadiene |
| 3,4-Dimethyl-1,4-hexadiene | 3,4-Dimethyl-2,4-hexadiene |
| 3,4-Dimethyl-1,4-hexadiene | 3,4-Dimethyl-1,3-hexadiene |
| 1,4-Heptadiene | 2,4-Heptadiene |
| 1,5-Heptadiene | 2,4-Heptadiene |
| 2-Methyl-1,5-heptadiene | 2-Methyl-2,4-heptadiene |
| 3-Methyl-1,5-heptadiene | 3-Methyl-2,4-heptadiene |
| 3-Methyl-1,5-heptadiene | 5-Methyl-2,4-heptadiene |
| 2,6-Octadiene | 3,5-Octadiene |
| 4-Methyl-1,5-heptadiene | 4-Methyl-2,4-heptadiene |
| 3,4-Dimethyl-1,5-heptadiene | 3,4-Dimethyl-3,5-heptadiene |
| 6-Methyl-1,5-heptadiene | 2-Methyl-2,4-heptadiene |
| 3-Methyl-1,5-heptadiene | 5-Methyl-2,4-heptadiene |
| 4,5-Dimethyl-2,6-octadiene | 4,5-Dimethyl-3,5-octadiene |
| 3,6-Dimethyl-1,5-heptadiene | 2,5-Dimethyl-2,4-heptadiene |

As understood from the above specific examples, this invention is generally applicable to isomerization of linear olefins, particularly having a double bond at the terminal position (i.e. the 1-position). The number of carbon atoms in the olefins is not limitative and may be usually from 4 to 20. The starting olefins are not necessarily required to be a single olefin and may be a mixture of two or more olefins. The kind of the olefins to be produced depends on that of the starting olefins. The produced olefins may be a single olefin or a mixture of two or more olefins. When the produced olefin can take cis and trans isomeric forms, the cis-isomer is usually produced in a predominant rate, but the trans-isomer increases gradually with the reaction time.

According to the present invention, the starting olefin is contacted with the catalyst composition whereby the isomerization takes place to give the isomerized olefin.

Although a specific limitation does not exist on the amount of the catalyst composition to be employed, it is usually employed in an amount of 1/1000 (0.001) to 1 part by weight per 1 part by weight of the starting olefin. Particularly preferred is 1/100 (0.01) to 1/5 (0.20) part by weight of the catalyst composition per 1 part by weight of the starting olefin.

The isomerization may be effected batchwise or continuously. It is usually effected at room temperature. Heating is not necessarily required and, even if made, does not afford any unfavorable influence on the isomerization.

When the starting olefin is liquid, it may be charged in a reaction vessel together with the catalyst composition from the initiation of the reaction or may be continuously or intermittently added to the reaction vessel depending on the proceeding of the reaction. In case of the starting olefin being gaseous, the reaction is favorably carried out in a sealed reaction vessel (e.g. autoclave) under elevated pressure.

If desired, an appropriate inert solvent such as hydrocarbon (e.g. pentane, hexane, heptane, isopentane, dodecane) or ether (e.g. diethylether, tetrahydrofuran, dioxane) may be used. For assuring the complete proceeding of the isomerization, the reaction is favorably effected in an inert gas.

The progress of the isomerization is usually examined by the gas chromatographic analysis or any other instrumental analysis. Since the reaction proceeds quantitatively with ease, the product is of high purity without applying any purification procedure thereto. If desired, however, it may be purified by a per se conventional procedure such as distillation or chromatography.

Most of the produced olefins are known and their utilizability may be obvious to those skilled in the art. For instance, 2,5-dimethyl-2,4-hexadiene is known to be valuable as the starting material in the synthesis of chrysanthemumic acid derivatives.

As stated above, the catalyst composition of the invention has various favorable features over the conventional dispersion catalyst. From the viewpoints of the production of some olefins, the advantages brought by the use of the catalyst composition are also notable. For instance, the isomerization of a mixture of 2,5-dimethylhexadienes (i.e. a mixture of 2,5-dimethyl-1,3-hexadiene, 2,5-dimethyl-1,4-hexadiene, 2,5-dimethyl-1,5-hexadiene and 2,5-dimethyl-2,4-hexadiene) to 2,5-dimethyl-2,4-hexadiene has heretofore been effected by the use of alumina or an organic acid (e.g. benzenesulfonic acid) as the catalyst. In such conventional method, however, the conversion of the starting material and the yield of the product are unsatisfactory. In addition, the separation of the main product is carried out with much difficulty. When the catalyst composition of the invention is employed, the conversion and the yield are highly improved and separation of the main product is accomplished with ease.

Presently preferred embodiments of the present invention are illustratively shown in the following Examples.

EXAMPLE A

In a 100 ml volume four-necked flask, activated alumina (50 g) was charged and stirred at 380° to 400°C for 2 hours under nitrogen. Sodium hydroxide (8.7 g) was portionwise added thereto at the same temperature, and the resultant mixture was stirred for 20 minutes. Then, metallic sodium (0.9 g) was portionwise added thereto, whereby the mixture became black but turned gradually white. After stirred for 2 hours, the reaction mixture was allowed to cool to give a catalyst product. The product was not ignited at exposure to air, and generation of hydrogen was not seen on admixture with water.

EXAMPLE B

In a 100 ml volume four-necked flask, activated alumina (50 g) was charged and stirred at 350+ to 400°C for 2 hours under nitrogen. Sodium hydroxide (5.0 g) was portionwise added thereto at the same temperature over 40 minutes, and the resultant mixutre was stirred for 20 minutes. Then, metallic sodium (1.8 g) was added thereto, and stirring was continued for 2 hours. The reaction mixture was allowed to cool to give a catalyst product.

EXAMPLE C

In a 100 ml volume four-necked flask, activated alumina (50 g) was charged and stirred at 400° to 420°C for 1.5 hours under nitrogen. Potassium hydroxide (85 percent; 12.2 g) was dropwise added thereto at the same temperature, and the resultant mixture was stirred for 40 minutes. Then, fragments of metallic potassium (1.5 g) were added thereto over 10 minutes, and stirring was continued for 2 hours at the same temperature. The reaction mixture was allowed to cool to give a catalyst product.

EXAMPLE D

In a 500 ml volume four-necked flask, activated alumina (200 to 300 mesh; 250 g) was charged and stirred at 390° to 400°C for 2 hours under nitrogen. Granules of sodium hydroxide (42.5 g) were portionwise added thereto at the same temperature over 20 minutes, and the resultant mixture was stirred for 1 hour. Then, fragments of metallic sodium (10 g) were added thereto over 10 minutes, and stirring was continued for 2 hours. The reaction mixture was allowed to cool to give a white catalyst product.

EXAMPLE E

In a 100 ml volume four-necked flask, activated alumina (50 g) was charged and stirred at 400° to 420°C for 2.5 hours under nitrogen. Sodium hydroxide (8.7 g) was portionwise added thereto at the same temperature, and the resultant mixture was stirred for 70 minutes. Then, fragments of metallic potassium (1.5 g) were added thereto over 10 minutes, whereby the mixture became violet but turned gradually white. After stirred for 2 hours, the reaction mixture was allowed to cool to give a catalyst product.

EXAMPLE F

In a 100 ml volume four-necked flask, activated alumina (50 g) was charged and stirred at 400° to 420°C for 2 hours under nitrogen. Sodium hydroxide (8.7 g) was portionwise added thereto at the same temperature, and the resultant mixture was stirred for 20 minutes. Then, metallic sodium (2.0 g) was portionwise added thereto, and stirring was continued for 60 minutes. The reaction mixture was allowed to cool to give a catalyst product. The product was colored grey or black, due to the presence of unreacted metallic sodium.

EXAMPLE G

In a 100 ml volume four-necked flask, alumina mainly consisting of γ type (water content, 6.0 percent)(50 g) was charged and heated up to 200°C under nitrogen while stirring. Fragments of metallic sodium (3.8 g) were added thereto at the same temperature over 20 minutes, and the resultant mixture was stirred for 1 hour. Then, the temperature was gradually raised up to 400°C, and fragments of metallic sodium (1.9 g) were added thereto over 10 minutes. Stirring was continued at the same temperature for 3.5 hours to give a catalyst product. The product was colored white, and the absence of metallic sodium was confirmed by the X-ray diffractiometry.

chromatographic analysis of the reaction mixture was performed. The results are shown in Table 2.

Table 2

| Time (min.) | Starting compound (%) Heptene-1 | Product (%) | | | |
|---|---|---|---|---|---|
| | | Heptene-2 (cis) | Heptene-2 (trans) | Heptene-3 (cis) | Heptene-3 (trans) |
| 5 | 0 | 43.5 | 11.3 | 37.6 | 7.7 |
| 10 | 0 | 43.5 | 11.4 | 37.5 | 7.9 |

EXAMPLE H

In a 100 ml volume four-necked flask, alumina mainly consisting of ζ and γ types (water content, 1.6 percent)(50 g) was charged and heated up to 400°C under nitrogen while stirring. Fragments of metallic potassium (1.8 g) were added thereto at the same temperature over 7 minutes, and the resultant mixture was stirred for 2 hours, and allowed to cool to give a catalyst product. The product was colored greyish white, and the absence of metallic potassium was confirmed by the X-ray diffractiometry.

EXAMPLE I

In a 100 ml volume four-necked flask, alumina mainly consisting of ρ type (water content, 8 percent) (50 g) was charged and heated up to 300°C under nitrogen while stirring. Metallic sodium (5.2 g) was portionwise added thereto at the name temperature over 15 minutes, and the resultant mixture was stirred for 1 hour. Then, the temperature was gradually raised up to 400'C, and metallic sodium (1.8 g) was added thereto over 5 minutes. Stirring was continued at the same temperature for 2 hours, and the reaction mixture was allowed to cool to give a catalyst product.

EXAMPLE 1

In a 25 ml volume flask, heptene-1 (5.0 g) was charged, and the atmosphere was replaced by nitrogen. The catalyst (1.9 g) obtained in Example A was added thereto, and the resultant mixture was stirred at room temperature (25°C). After 10, 40 and 240 minutes, a small amount of the reaction mixture was taken out and subjected to gas chromatography so as to observe the progress of isomerization, the results of which are shown in Table 1.

Table 1

| Time (min.) | Starting compound (%) Heptene-1 | Product (%) | | | |
|---|---|---|---|---|---|
| | | Heptene 2 (cis) | Heptene-2 (trans) | Heptene-3 (cis) | Heptene-3 (trans) |
| 10 | 0 | 43.4 | 11.3 | 37.8 | 7.5 |
| 40 | 0 | 39.5 | 12.8 | 38.9 | 8.8 |
| 240 | 0 | 39.4 | 12.8 | 39.0 | 8.8 |

After elimination of the catalyst by filtration, the reaction mixture was distilled to give colorless oil (4.6 g). B.P., 95° to 98°C. The formation of high boiling point materials or polymers was not seen.

EXAMPLE 2

The isomerization of heptene-1 was executed in the same manner as in Example 1 except that the reaction temperature was 60°C. After 5 and 10 minutes, the gas chromatographic analysis of the reaction mixture was performed. The results are shown in Table 2.

EXAMPLE 3

In a 25 ml volume flask, 4-methylpentene-1 (5.0 g) was charged, and the atmosphere was replaced by nitrogen. The catalyst (1.9 g) obtained in Example A was added thereto, and the resultant mixture was stirred at room temperature (25°C). After 10, 30 and 240 minutes, the gas chromatographic analysis of the reaction mixture was performed. The results are shown in Table 3.

Table 3

| Time (min.) | Starting compound (%) 4-Methyl-pentene-1 | Product (%) | | |
|---|---|---|---|---|
| | | 4-Methyl-pentene-2 (cis) | 4-Methyl-pentene-2 (trans) | 2-Methyl-pentene-2 |
| 10 | 0 | 68.3 | 3.1 | 28.6 |
| 30 | 0 | 55.9 | 4.3 | 39.7 |
| 240 | 0 | 26.7 | 8.2 | 65.1 |

After elimination of the catalyst by filtration, the reaction mixture was distilled to give colorless oil (4.7 g). B.P., 57° to 65°C.

EXAMPLE 4

The isomerization of 4-methylpentene-1 was executed in the same manner as in Example 3 except that the reaction temperature was 60°C. After 10, 40 and 120 minutes, the gas chromatographic analysis of the reaction mixture was performed. The results are shown in Table 4.

Table 4

| Time (min.) | Starting compound (%) 4-Methyl-pentene-1 | Product (%) | | |
|---|---|---|---|---|
| | | 4-Methyl-pentene-2 (cis) | 4-Methyl-pentene-2 (trans) | 2-Methyl-pentene-2 (cis) |
| 10 | 0 | 29.3 | 10.1 | 60.6 |
| 40 | 0 | 13.9 | 12.3 | 73.8 |
| 120 | 0 | 2.1 | 4.5 | 93.7 |

EXAMPLE 5

In a 25 ml volume flask, 2,3-dimethylbutene-1-(5.0 g) was charged, and the catalyst (1.0 g) obtained in Example A was added in nitrogen stream. The resultant mixture was stirred at room temperature (25°C). After 2, 5, 10 and 20 minutes, the gas chromatographic analysis of the reaction mixture was performed. The results are shown in Table 5.

Table 5

| Time (min.) | Starting compound (%) 2,3-Dimethylbutene-1 | Product (%) 2,3-Dimethylbutene-2 |
|---|---|---|
| 2 | 12.5 | 87.5 |
| 5 | 6.3 | 93.7 |
| 10 | 5.0 | 95.0 |
| 20 | 4.9 | 95.1 |

EXAMPLES 6, 7 and 8

In a 25 ml volume flask, isomerization of an olefinic hydrocarbon (5 g) was executed at room temperature in nitrogen stream by the use of the catalyst (2 g) obtained in Example B. The results are shown in Table 6.

Table 6

| Example No. | Starting compound | Reaction time (min.) | Conversion (%) | Product (%) | | | Yield (%) |
|---|---|---|---|---|---|---|---|
| 6 | Heptene- | 10 | 100 | Heptene-2 | (cis) | 40.3 | 95 |
| | | | | Heptene-2 | (trans) | 12.5 | |
| | | | | Heptene-3 | (cis) | 39.5 | |
| | | | | Heptene-3 | (trans) | 7.3 | |
| 7 | 4-Methyl-pentene-1 | 10 | 100 | 4-Methyl-pentene-2 | (cis) | 10.6 | 96 |
| | | | | 4-Methyl-pentene-2 | (trans) | 8.2 | |
| | | | | 2-Methyl-pentene-2 | | 81.2 | |
| 8 | Octene-1 | 10 | 14 | Octene-2 | (cis) | 8.9 | |
| | | | | Octene-2 | (trans) | 5.1 | |
| | | 60 | 67.7 | Octene-2 | (cis) | 33.1 | |
| | | | | Octene-2 | (trans) | 34.6 | |
| | | 60 *) | 72.7 | Octene-2 | (cis) | 10.5 | |
| | | | | Octene-2 | (trans) | 62.2 | |

Note: *)The reaction temperature was 60°C.

EXAMPLE 9

In a 25 ml volume flask, heptene-1 (5.0 g) was charged, and the catalyst (2.0 g) obtained in Example D was added in nitrogen stream. The resultant mixture was stirred at room temperature (25°C). After 10 and 60 minutes, the gas chromatographic analysis of the reaction mixture was performed. The results are shown in Table 7.

Table 7

| Time (min.) | Starting compound (%) Heptene-1 | Product (%) | | | |
|---|---|---|---|---|---|
| | | Heptene-2 (cis) | Heptene-2 (trans) | Heptene-3 (cis) | Heptene-3 (trans) |
| 10 | 38.3 | 26.5 | 6.2 | 24.6 | 4.4 |
| 60 | 37.8 | 26.5 | 6.4 | 24.8 | 4.5 |

EXAMPLE 10

In a 25 ml volume flask, 1,5-hexadiene (5.0 g) was charged, and the catalyst (1.5 g) obtained in Example A was added thereto in nitrogen stream. The resultant mixture was stirred at room temperature (25°C). After 5 minutes, the presence of the objective 2,4-hexadiene in 75 % was shown by the gas chromatographic analysis of the reaction mixture, and after 15 minutes, the completion of the isomerization was confirmed. The reaction mixture was filtered so as to eliminate the catalyst, and the filtrate was distilled to give a liquid product (4.9 g). B.P., 80° to 82°C. The gas chromatographic analysis of the product revealed the presence of 2,4-hexadiene and 1,3-hexadiene respectively in 98.5 and 1.5 percent.

EXAMPLE 11

In a 25 ml volume flask, 1,4-hexadiene (5.0 g) was charged, and the catalyst (1.5 g) obtained in Example A was added thereto in nitrogen stream. The resultant mixture was stirred at room temperature (25°C). After 15 minutes, the gas chromatographic analysis of the reaction mixture revealed the presence of the objective 2,4-hexadiene in 99 percent. The reaction mixture was filtered so as to eliminate the catalyst, and the filtrate was distilled to give a liquid product (4.7 g). B.P., 80° to 82°C.

EXAMPLE 12

In a 25 ml volume flask, 2,5-dimethyl-1,5-hexadiene (5.0 g) was charged, and the catalyst (1.2 g) obtained in Example A was added thereto in nitrogen stream. The resultant mixture was stirred at room temperature (25°C). After 10 minutes, the gas chromatographic analysis of the reaction mixture revealed the presence of the objective 2,5-dimethyl-2,4-hexadiene in 99 percent. The reaction mixture was filtered so as to eliminate the catalyst, and the filtrate was distilled to give a liquid product (4.9 g). B.P., 132° to 134°C.

EXAMPLE 13

In a 25 ml volume flask, 2,5-dimethyl-1,4-hexadiene (5.0 g) was charged, and the catalyst (1.2 g) obtained in Example A was added thereto in nitrogen stream. The resultant mixture was stirred at room temperature (25°C). After 10 minutes, completion of the isomerization was confirmed by the gas chromatographic analysis of the reaction mixture. The reaction mixture was filtered so as to eliminate the catalyst, and the filtrate was distilled to give 2,5-dimethyl-2,4-hexadiene (4.8 g). B.P., 132° to 134°C.

EXAMPLE 14

In a 25 ml volume flask, 2-methyl-1,5-hexadiene (5.0 g) was charged, and the catalyst (1.0 g) obtained in Example A was added thereto in nitrogen stream. The resultant mixture was stirred at room temperature (25°C). After 20 minutes, the gas chromatographic analysis of the reaction mixture showed the presence of the objective 2-methyl-2,4-hexadiene in 88 percent, and after 60 minutes, the presence thereof in 99 percent was confirmed. The reaction mixture was filtered so as to eliminate the catalyst, and the filtrate was distilled to give a liquid product (4.5 g). B.P., 109° to 111°C.

EXAMPLE 15

In a 25 ml volume flask, 1,4-pentadiene (5.0 g) was charged, and the catalyst (1.0 g) obtained in Example A was added thereto in nitrogen stream. The resultant mixture was stirred at 0°C. After 10 minutes, the gas chromatograhic analysis of the reaction mixture showed the presence of the objective 1,3-pentadiene in 56 percent, and after 120 minutes, the presence thereof in 95 percent was confimed. The reaction mixture was filtered so as to eliminate the catalyst, and the filtrate was distilled to give a liquid product (4.2 g). B.P., 40° to 44°C.

EXAMPLE 16

In a 25 ml volume flask, 1,4-hexadiene (5.0 g) was charged, and the catalyst (1.5 g) obtained in Example C was added thereto in nitrogen stream. The resultant mixture was stirred at room temperature (25°C). The gas chromatographic analysis of the reaction mixture was performed immediately after the beginning of the reaction and then after 20, 60, 180 and 240 minutes. The results are shown in Table 8.

Table 8

| Time (min.) | 1,4-Hexadiene (%) | 2,4-Hexadiene (%) | 1,3-Hexadiene (%) |
|---|---|---|---|
| 0 | 98.0 | 2.0 | 0 |
| 20 | 39.9 | 58.5 | 1.5 |
| 60 | 24.3 | 74.1 | 1.6 |
| 180 | 10.3 | 89.1 | 1.6 |
| 240 | 0 | 98.3 | 1.7 |

After elimination of the catalyst by filtration, the reaction mixture was distilled to give 2,4-hexadiene (4.6 g). B.P., 80° to 82°C.

EXAMPLE 17

In a 25 ml volume flask, there was charged a mixture comprising 2.0 % of 2,5-dimethyl-1,5-hexadiene (hereinafter referred to as "DMHD-1,5"), 37.0 % of 2,5-dimethyl-1,4-hexadiene (hereinafter referred to as "DMHD-1,4"), 35.6 % of 2,5-dimethyl-1,3-hexadiene (hereinafter referred to as "DMHD-1,3") and 25.3 % of 2,5-dimethyl-2,4-hexadiene (hereinafter referred to as "DMHD-2,4")(5.0 g), and the catalyst (1.0 g) obtained in Example D was added thereto in nitrogen stream. The resultant mixture was stirred vigorously at room temperature. After 5, 20 and 60 minutes, the gas chromatographic analysis of the reaction mixture was performed. The results are shown in Table 9.

Table 9

| Time (min.) | DMHD-1,5 (%) | DMHD-1,4 (%) | DMHD-1,3 (%) | DMHD-2,4 (%) |
|---|---|---|---|---|
| 0 | 2.0 | 37.0 | 35.6 | 25.3 |
| 5 | 0 | 0 | 7.0 | 93.0 |
| 20 | 0 | 0 | 3.0 | 97.0 |
| 60 | 0 | 0 | 0.1 | 99.9 |

After elimination of the catalyst by filtration, the reaction mixture was distilled to give DMHD-2,4 (4.8 g). B.P., 134°C.

EXAMPLE 18

In a glass made reactor of 10 mm in inner diameter and of 50 cm in length, the catalyst (15 g) obtained in Example D was charged in nitrogen stream. A mixture comprising 2.0 % of DMHD-1,5, 37.0 % of DMHD-1,4 35.6 % of DMHD-1,3 and 25.3 % of DMHD-2,4 was continuously introduced therein from the upper part, and the reaction product was taken out from the lower part at the rate of 1.1 g/min. The obtained product was continuously subjected to gas chromatography, the results of which always revealed the presence of DMHD-2,4 in 100 percent. After introduction of 200 g of the mixture, 186 g of the product were obtained, and the catalytic activity of the catalyst was not reduced. When the catalyst was extracted with heptane, pure DMHD-2,4 (13.5 g) was obtained.

EXAMPLE 19

In a 25 ml volume flask, there was charged a mixture comprising 15.0 % of DMHD-1,5 19.2 % of DMHD-1,4, 39.4 % of DMHD-1,3 and 27.4 % of DMHD-2,4 (5.0 g), and the catalyst (1.0 g) obtained in Example C was added thereto in nitrogen stream. The resultant mixture was stirred at room temperature. After 10, 20 and 60 minutes, the gas chromatographic analysis of the reaction mixture was performed. The results are shon in Table 10.

Table 10

| Time (min.) | DMHD-1,5 (%) | DMHD-1,4 (%) | DMHD-1,3 (%) | DMHD-2,4 (%) |
|---|---|---|---|---|
| 0 | 15.0 | 19.2 | 39.4 | 27.4 |
| 10 | 1.1 | 1.5 | 7.3 | 90.0 |
| 20 | 0.2 | 0.2 | 0.9 | 98.7 |
| 60 | 0 | 0 | 0.6 | 99.4 |

After elimination of the catalyst by filtration, the reaction mixture was distilled to give DMHD-2,4 (4.7 g). B.P., 132° to 134°C.

EXAMPLE 20

In a 25 ml volume flask, there was charged a mixture comprising 2.0 % of DMHD-1,5, 37.0 % of DMHD-1,4, 35.6 % of DMHD-1,3 and 25.3 % of DMHD-2,4 (5.0 g), and the catalyst (1.0 g) obtained in Example E was added thereto in nitrogen stream. The resultant mixture was stirred vigorously at room temperature. After 2 hours, the gas chromatographic analysis of the reaction mixture was performed. The results are shown in Table 11.

Table 11

| Time (hr.) | DMHD-1,5 (%) | DMHD-1,4 (%) | DMHD-1,3 (%) | DMHD-2,4 (%) |
|---|---|---|---|---|
| 0 | 2.0 | 37.0 | 35.6 | 25.3 |
| 2 | 0 | 0 | 4.0 | 96.0 |

EXAMPLE 21

In a 25 ml volume flask, there was charged a mixture comprising 2.0 % of DMHD-1,5, 37.0 % of DMHD-1,4, 35.6 % of DMHD-1,3 and 25.3 % of DMHD-2,4 (5.0 g), and the catalyst (1.0 g) obtained in Example F was added thereto in nitrogen stream. The resultant mixture was stirred vigorously at room temperature. After 2 hours, the gas chromatographic analysis of the reaction mixture was performed. The results are shown in Table 12.

Table 12

| Time (hr.) | DMHD-1,5 (%) | DMHD-1,4 (%) | DMHD-1,3 (%) | DMHD-2,4 (%) |
|---|---|---|---|---|
| 0 | 2.0 | 37.0 | 35.6 | 25.3 |
| 2 | 0 | 3.5 | 7.5 | 89.0 |

EXAMPLE 22

In a 35 ml volume flask, there was chraged a mixture comprising 15.0 % of DMHD-1,5, 13.1 % of DMHD-1,4, 35.0 % of DMHD-1,3 and 36.9 % of DMHD-2,4 (10.0 g), and the catalyst (1.8 g) obtained in Example I was added thereto in nitrogen stream. The resultant mixture was stirred vigorously at 50°C. After 10, 20 and 30 minutes, the gas chromatographic analysis of the reaction mixture was performed. The results are shown in Table 13.

Table 13

| Time (min.) | DMHD-1,5 (%) | DMHD-1,4 (%) | DMHD-1,3 (%) | DMHD-2,4 (%) |
|---|---|---|---|---|
| 0 | 15.0 | 13.1 | 35.0 | 36.9 |
| 10 | 3.2 | 1.6 | 13.0 | 82.2 |
| 20 | 1.1 | 0.9 | 4.3 | 93.7 |
| 30 | 0.1 | — | 0.3 | 99.5 |

EXAMPLE 23

In a 35 ml volume flask, there was charged a mixture comprising 46.2 % of 2,3-dimethylbutene-1 and 53.8 % of 2,3-dimethylbutene-2 (5.0 g), and the catalyst (1.0 g) obtained in Example D was added thereto in nitrogen stream. The resultant mixture was stirred at room temperature. After 5, 15 and 30 minutes, the gas chromatographic analysis of the reaction mixture was performed. The results are shown in Table 14.

Table 14

| Time (min.) | 2,3-Dimethylbutene-1 (%) | 2,3-Dimethylbutene-2 (%) |
|---|---|---|
| 0 | 46.2 | 53.8 |
| 5 | 27.7 | 72.3 |
| 15 | 8.6 | 91.4 |
| 30 | 0.3 | 99.7 |

EXAMPLE 24

In a 35 ml volume flask, there was chraged a solution of a mixture comprising 46.2 % of 2,3-dimethylbutene-1 and 53.8 % of 2,3-dimethylbutene-2 (5 g) in anhydrous heptane (5 ml), and the catalyst (1.0 g) obtained in Example D was added thereto in nitrogen stream. The resultant mixture was stirred at room temperature. After 5 and 15 minutes, the gas chromatographic analysis of the reaction mixture was performed. The results are shown in Table 15.

Table 15

| Time (min.) | 2,3-Dimethylbutene-1 (%) | 2,3-Dimethylbutene-2 (%) |
|---|---|---|
| 0 | 46.2 | 53.8 |
| 5 | 5.7 | 94.3 |
| 15 | 5.1 | 94.9 |

EXAMPLE 25

In a glass made reactor of 10 mm in inner diameter and of 50 cm in length, the catalyst (15 g) obtained in Example D was charged in nitrogen stream. A mixture comprising 46.2 % of 2,3-dimethylbutene-1 and 53.8 % of 2,3-dimethylbutene-2 was continuously introduced therein from the upper part, and the reacted product was taken out from the lower part at the rate of 1.0 g/min. The obtained product was continuously subjected to gas chromatography, the results of which always revealed the presence of 2,3-dimethylbutene-2 in 98 to 99 percent. After introduction of 180 g of the mixture, 171 g of the product were obtained without any reduction of the catalytic activity of the catalyst. When the catalyst was extracted with heptane, 2,3-dimethylbutene-2 (7.5 g) was additionally obtained.

EXAMPLE 26

In a 35 ml volume flask, there was chraged a mixture comprising 46.2 % of 2,3-dimethylbutene-1 and 53.8 % of 2,3-dimethylbutene-2 (5.0 g), and the catalyst (1.2 g) obtained in Example F was added thereto in nitrogen stream. The resultant mixture was stirred vigorously at room temperature. After 10, 30 and 60 minutes, the gas chromatographic analysis of the reaction mixture was performed. The results are shown in Table 16.

Table 16

| Time (min.) | 2,3-Dimethylbutene-1 (%) | 2,3-Dimethylbutene-2 (%) |
|---|---|---|
| 0 | 46.2 | 53.8 |
| 10 | 30.5 | 69.5 |
| 30 | 25.8 | 74.2 |
| 60 | 16.5 | 83.5 |

EXAMPLE 27

In a 35 ml volume flask, a solution of a mixture of 2,3-dimethylbutene-1 and 2,3-dimethylbutene-2 (5.0 g) in anhydrous heptane (5 ml) was charged, and the atmosphere was replaced by nitrogen. The catalyst (1.5 g) obtained in Example H was added thereto, and the resultant mixture was stirred at room temperature. After 30 minutes, a small amount of the reaction mixture was taken out and subjected to gas chromatography so as to observe the progress of isomerization, the results of which are shown in Table 17.

Table 17

| Time (min.) | 2,3-Dimethylbutene-1 (%) | 2,3-Dimethylbutene-2 (%) |
|---|---|---|
| 0 | 46.3 | 53.7 |
| 30 | 3.7 | 96.2 |

EXAMPLE 28

In a 35 ml volume flask, 4-methylpentene-1 (10.0 g) was charged, and the atmosphere was replaced by nitrogen. The catalyst (2.0 g) obtained in Example G was added thereto, and the resultant mixture was stirred at 50°C. After 10, 30 and 120 minutes, the gas chromatographic analysis of the reaction mixture was performed. The results are shown in Table 18.

Table 18

| Time (min.) | Starting compound (%) | 4-Methyl-pentene-2 (cis) (%) | 4-Methyl-pentene-2 (trans) (%) | 2-Methyl-pentene-2 (%) |
|---|---|---|---|---|
| 10 | 0 | 29.1 | 10.6 | 60.3 |
| 30 | 0 | 10.5 | 10.7 | 78.8 |
| 120 | 0 | 1.6 | 3.4 | 95.0 |

After elimination of the catalyst by filtration, the reaction mixture was distilled to give oil (9.7 g). B.P., 60° to 65°C.

EXAMPLE 29

In a 35 ml volume flask, 2,5-dimethyl-1,4-hexadiene (10.0 g) was charged, and the atmosphere was replaced by nitrogen. The catalyst (1.6 g) obtained in Example G was added thereto, and the resultant mixture was stirred at room temperature. After 10 minutes, the gas chromatographic analysis of the reaction mixture revealed the presence of the objective 2,5-dimethyl-2,4-hexadiene in 99 percent. The reaction mixture was filtered so as to eliminate the catalyst, and the filtrate was distilled to give a liquid product (9.6 g). B.P., 132° to 134°C.

EXAMPLE 30

In a 25 ml volume flask, 2 methyl-1,5-hexadiene (5.0 g) was charged, and the atmosphere was replaced by nitrogen. The catalyst (1.0 g) obtained in Example H was aded thereto, and the resultant mixture was stirred at room temperature. After 30 minutes, the gas chromatographic analysis of the reaction mixture revealed the presence of the objective 2-methyl-2,4-hexadiene in 89 percent. After 60 minutes, the presence of the said product was in 98 percent. The reaction mixture was filtered so as to eliminate the catalyst, and the filtrate was distilled to give a liquid product (4.6 g). B.P., 109° to 111°C.

What is claimed is:

1. A method for isomerization of olefins which comprises contacting a linear, isomerizable olefinic hydrocarbon with a catalyst to give the corresponding linear, isomerizable olefinic hydrocarbon, the said catalyst being prepared by heating alumina, from 0.01 to 100 percent by weight of the alumina of an alkali metal hydroxide, and from 0.01 molar to an equimolar amount with respect to the alkali metal hydroxide of an alkali metal at a temperature higher than the melting point of the alkali metal to give a catalyst composition which does not contain metallic alkali metal and consequently does not ignite on exposure to air and does not generate hydrogen on admixture with water.

2. The method according to claim 1, wherein the starting olefinic hydrocarbon has a double bond at the terminal position.

3. The method according to claim 1, wherein the starting olefinic hydrocarbon is a monoolefinic hydrocarbon having a double bond at the terminal position.

4. The method according to claim 1, wherein the starting olefinic hydrocarbon is a diolefinic hydrocarbon having a double bond at the terminal position.

5. The method according to claim 1, wherein the starting olefinic hydrocarbon has 4 to 20 carbon atoms.

6. The method according to claim 1, wherein the starting olefinic hydrocarbon is a mixture of 2,5-dimethyl-1,3-hexadiene, 2,5-dimethyl-1,4-hexadiene, 2,5-dimethyl-1,5-hexadiene and 2,5-dimethyl-2,4-hexadiene.

7. The method according to claim 1, wherein the starting olefinic hydrocarbon is a mixture of 2,3-dimethylbutene-1 and 2,3-dimethylbutene-2.

8. A method for isomerization of linear, isomerizable olefinic hydrocarbons having a double bond which comprises contacting 1 part by weight of the said olefinic hydrocarbon with 0.001 to 1 part by weight of a catalyst at room temperature to give the corresponding linear, isomerized olefinic hydrocarbon wherein the double bond therein is migrated, the said catalyst being prepared by heating alumina, from 0.01% to 100% by weight of the alumina of an alkali metal hydroxide, and from 0.01 molar to an equimolar amount with respect to the alkali metal hydroxide of an alkali metal at a temperature higher than the melting point of the alkali metal to give a catalyst composition which does not contain metallic alkali metal and consequently does not ignite on exposure to air and does not generate hydrogen on admixture with water.

9. The method according to claim 8, wherein the starting olefinic hydrocarbon has 4 to 20 carbon atoms.

10. A method for isomerization of linear, isomerizable olefinic hydrocarbons having a double bond at the terminal position thereof which comprises contacting 1 part by weight of the said olefinic hydrocarbon with 0.001 to 1 part by weight of a catalyst at room temperature to give the corresponding linear, isomerized olefinic hydrocarbon wherein the double bond is migrated to any inner position, the said catalyst being prepared by heating alumina, from 0.01 to 100 percent by weight of the alumina of an alkali metal hydroxide, and from 0.01 molar to an equimolar amount with respect to the alkali metal hydroxide of an alkali metal at a temperature from 200° to 500°C. to give a catalyst composition which does not contain metallic alkali metal and consequently does not ignite on exposure to air and does not generate hydrogen on admixture with water.

11. The method according to claim 10, wherein the starting olefinic hydrocarbon has 4 to 20 carbon atoms.

12. A method for isomerization of linear, non-conjugated, isomerizable olefinic hydrocarbons having a double bond at the terminal position thereof which comprises contacting 1 part by weight of the said olefinic hydrocarbon with 0.001 to 1 part by weight of a catalyst at room temperature to give the corresponding linear, conjugated, isomerized olefinic hydrocarbon wherein the double bond is migrated to any inner position, the said catalyst being prepared by heating alumina, from 0.01 to 100 percent by weight of the alumina of an alkali metal hydroxide, and from 0.01 molar to an equimolar amount with respect to the alkali metal hydroxide of an alkali metal at a temperature from 200° to 500°C. to give a catalyst composition which does not contain metallic alkali metal and consequently does not ignite on exposure to air and does not generate hydrogen on admixture with water.

13. The method according to claim 12, wherein the starting olefinic hydrocarbon has 4 to 20 carbon atoms.

14. A method for production of 2,5-dimethyl-2,4-hexadiene which comprises contacting at least one of 2,5-dimethyl-1,3-hexadiene, 2,5-dimethyl-1,4-hexadiene and 2,5-dimethyl-1,5-hexadiene with or without 2,5-dimethyl-2,4-hexadiene with a catalyst prepared by heating alumina, from 0.01 to 100 percent by weight of the alumina of an alkali metal hydroxide, and from 0.01 molar to an equimolar amount with respect to the alkali metal hydroxide of an alkali metal at a temperature from 200° to 500°C. to give a catalyst composition which does not contain metallic alkali metal and consequently does not ignite on exposure to air and does not generate hydrogen on admixture with water.

15. A method for production of 2,3-dimethylbutene-2 which comprises contacting 2,3-dimethylbutene-1 or its mixture with 2,3-dimethylbutene-2 with a catalyst prepared by heating alumina, from 0.01 to 100 percent by weight of the alumina of an alkali metal hydroxide, and from 0.01 molar to an equimolar amount with respect to the alkali metal hydroxide of an alkali metal at a temperature from 200° to 500°C. to give a catalyst composition which does not contain metallic alkali metal and consequently does not ignite on exposure to air and does not generate hydrogen on admixture with water.

* * * * *